United States Patent [19]

Anderson

[11] 4,273,066
[45] Jun. 16, 1981

[54] OIL STORAGE VESSEL, MOORING APPARATUS AND OIL DELIVERY FOR THE OFF-SHORE PRODUCTION OF OIL

[75] Inventor: Harold E. Anderson, Frilsham, Nr. Newbury, England

[73] Assignee: Sea Terminals Limited, Berkshire, England

[21] Appl. No.: 885,591

[22] Filed: Mar. 13, 1978

[51] Int. Cl.³ .............................................. B65D 88/78
[52] U.S. Cl. .................................... 114/256; 9/8 P; 114/230; 141/279; 141/387; 414/138; 414/140
[58] Field of Search .................... 9/8 P; 114/230, 256, 114/74 R, 244, 218, 210; 214/12-14, 15 R; 141/279, 284, 387, 388; 254/190 R, 189; 414/138-140

[56] References Cited

U.S. PATENT DOCUMENTS

| | | | |
|---|---|---|---|
| 2,997,188 | 8/1961 | Hauser | 214/15 R |
| 3,270,705 | 9/1966 | Roeggen | 114/218 |
| 3,347,526 | 10/1967 | Cymmer et al. | 254/190 R |
| 3,366,088 | 1/1968 | Gibson | 114/230 |
| 3,407,768 | 10/1968 | Graham | 114/230 X |
| 3,577,951 | 5/1971 | Smith | 114/210 |
| 3,590,407 | 7/1971 | Bratianu | 114/256 X |
| 3,601,075 | 8/1971 | Deslierres | 9/8 P X |
| 3,641,602 | 2/1972 | Flory et al. | 9/8 P |
| 3,670,686 | 6/1972 | Reynolds | 114/230 |
| 3,833,032 | 9/1974 | Hnof | 141/279 X |

FOREIGN PATENT DOCUMENTS 2056756 5/1971 Fed. Rep. of Germany ........ 114/74 R

Primary Examiner—Sherman D. Basinger
Attorney, Agent, or Firm—Browdy & Neimark

[57] ABSTRACT

A method of delivering oil from an off-shore well to the shore is provided which comprises the steps of (a) supplying oil from the well to a floating storage vessel stationed close to the well; and (b) transferring oil by means of a flexible pipeline from the floating storage vessel to a service tanker which plies between the shore and the floating storage vessel. An oil storage vessel is also provided which has (a) a flexible hose for delivery of oil, one end of said hose being adapted for connection to the oil storage capacity of the vessel; and (b) a support system over which a hose selected from said flexible hose and a further hose connected to said flexible hose may be carried so as to extend from the stern of the oil storage vessel towards another vessel. Apparatus for and methods of mooring such a vessel are also provided.

33 Claims, 11 Drawing Figures

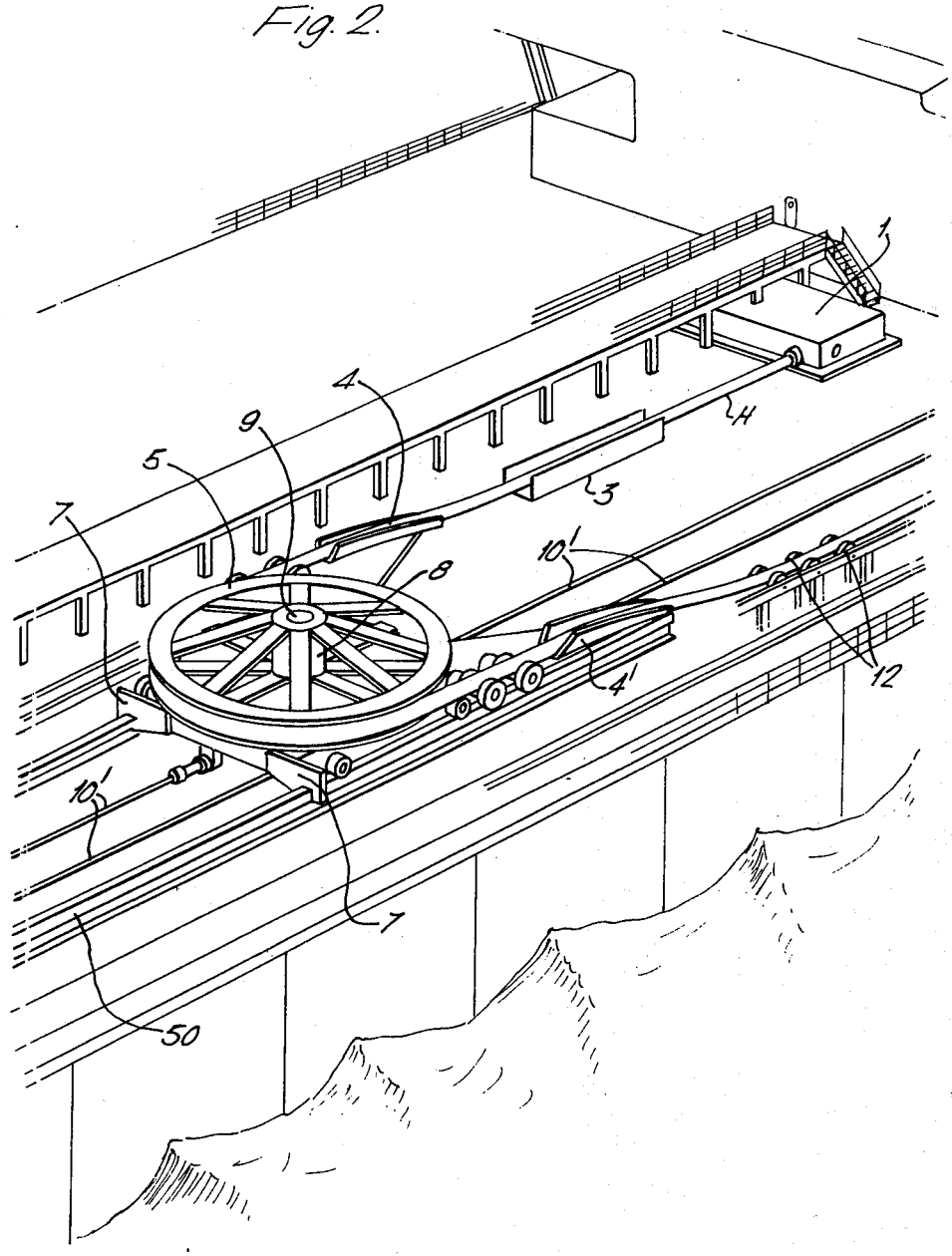

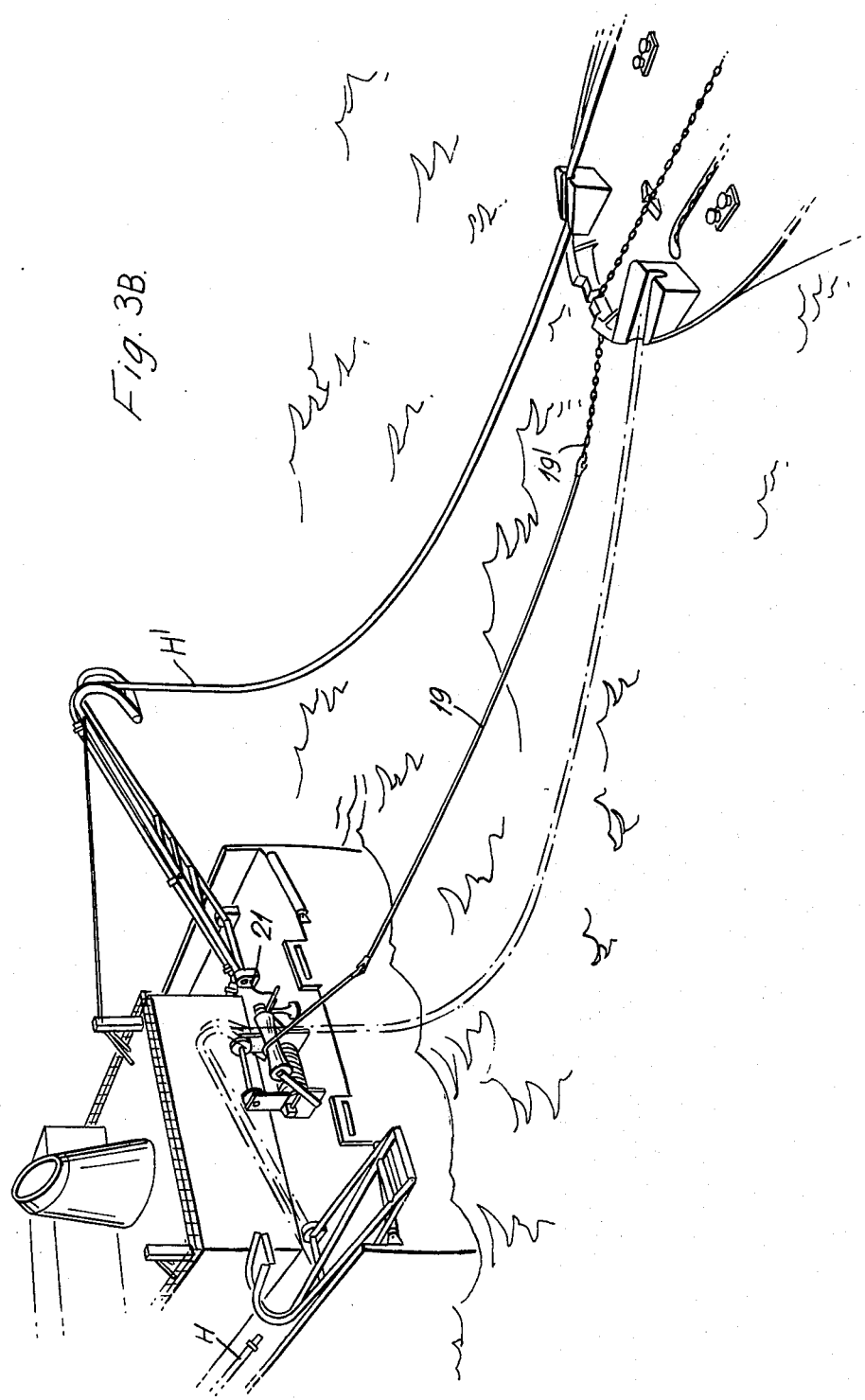

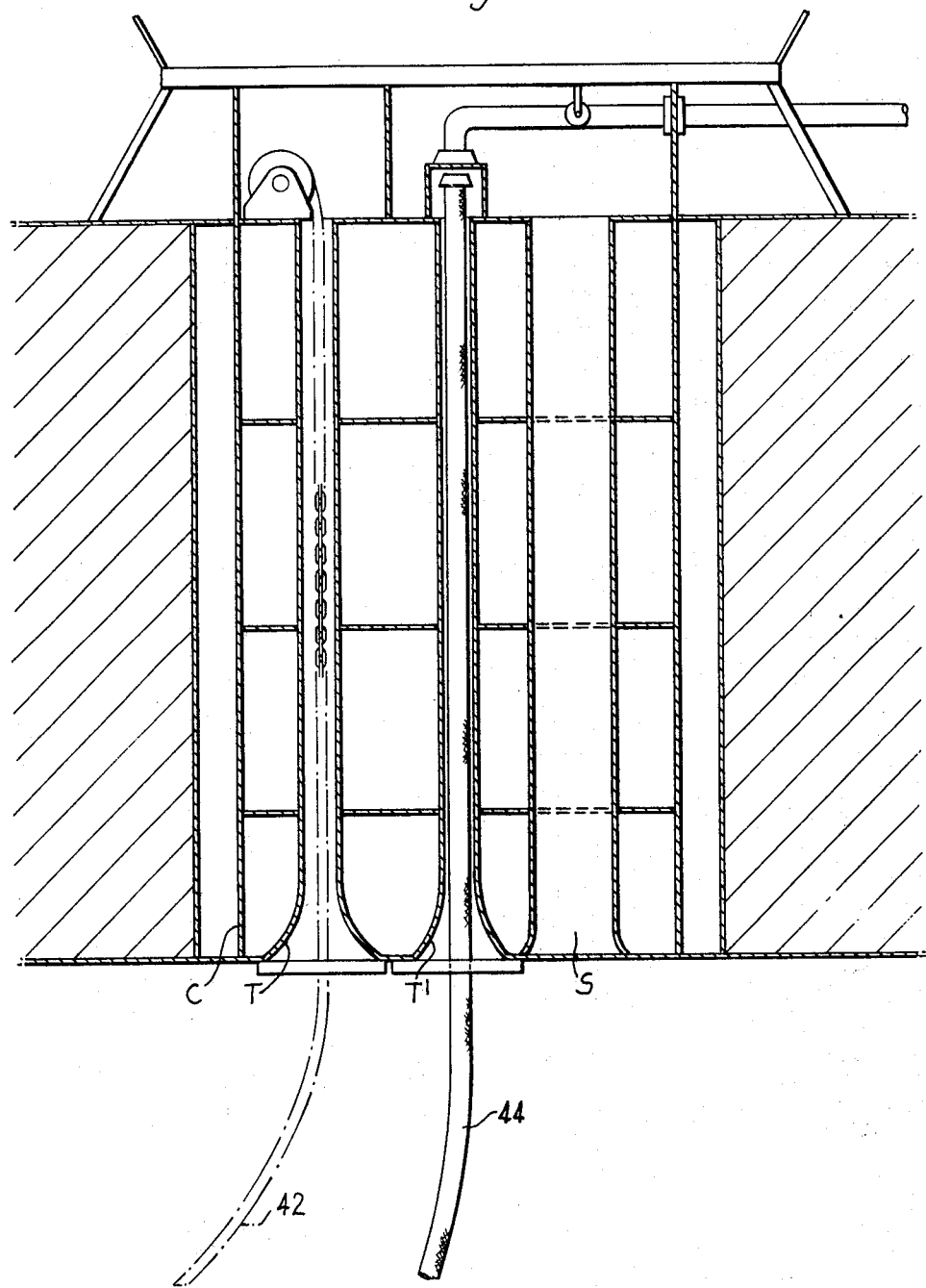

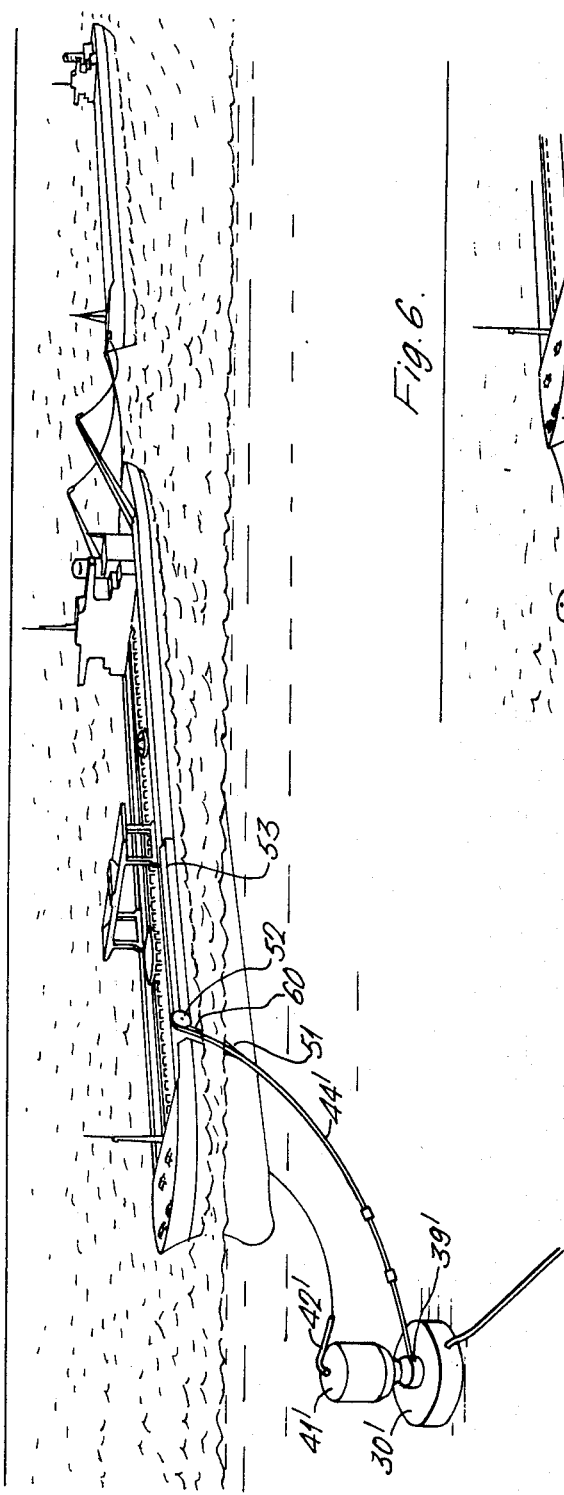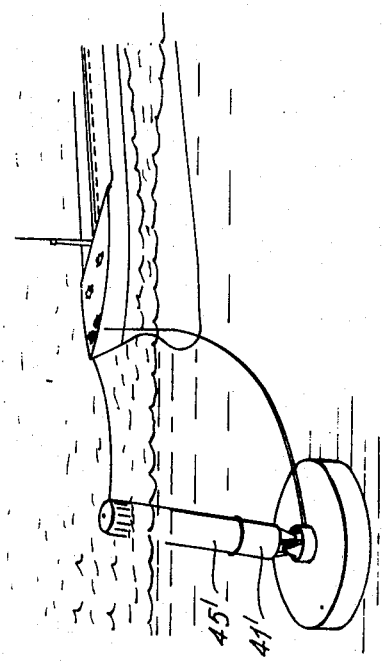

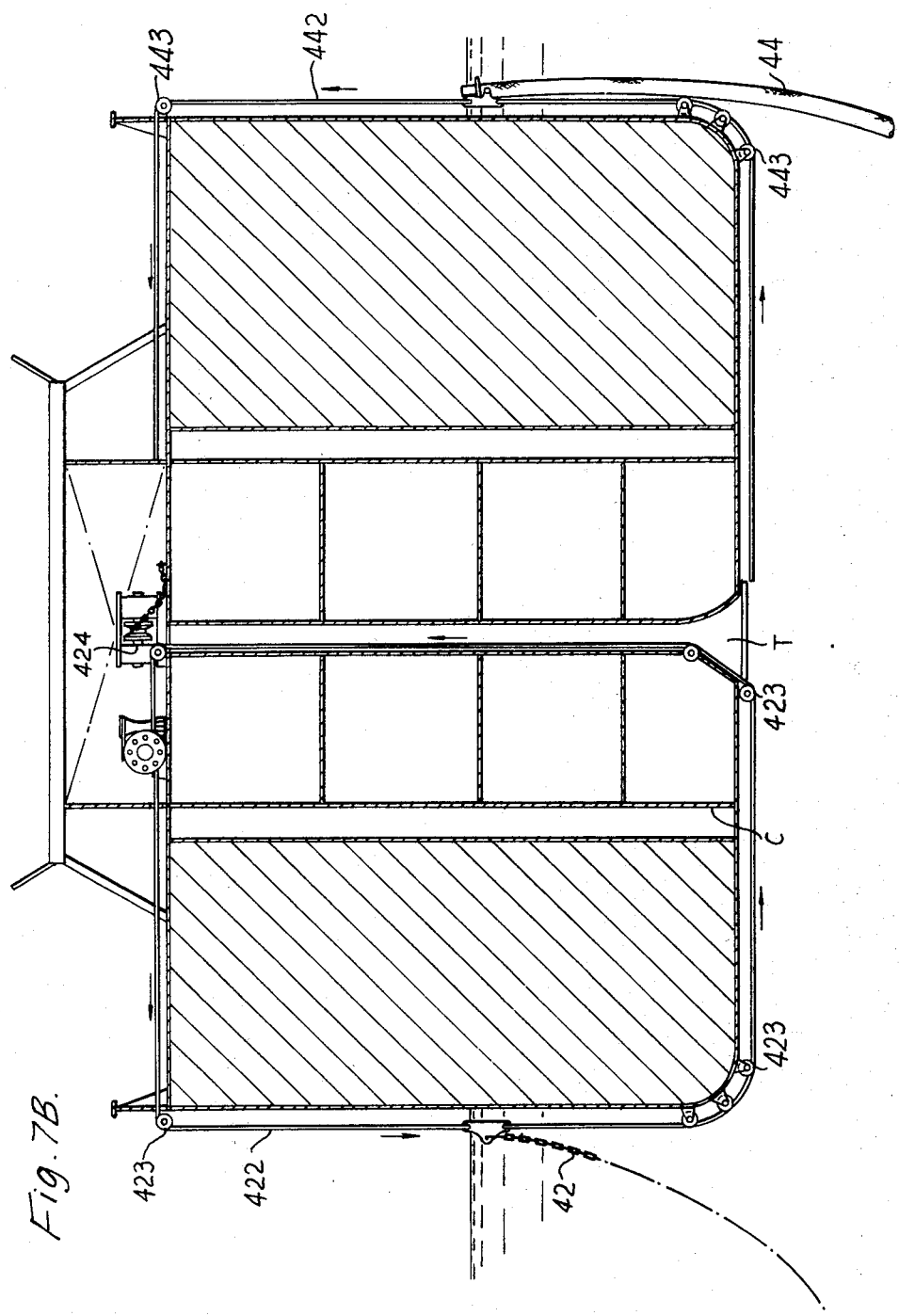

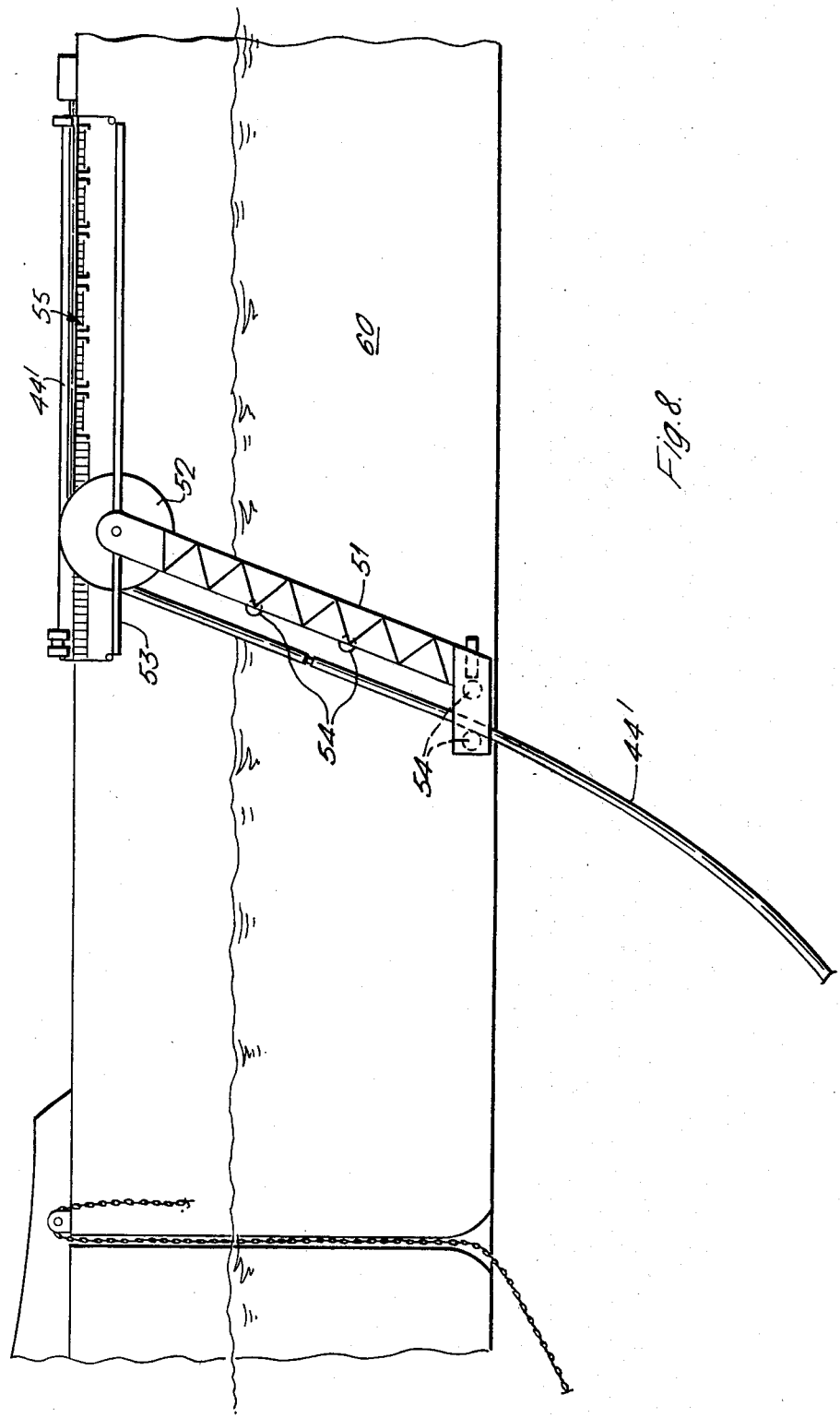

OIL STORAGE VESSEL, MOORING APPARATUS AND OIL DELIVERY FOR THE OFF-SHORE PRODUCTION OF OIL

FIELD OF THE INVENTION

This invention relates to the storage and transfer of oil from an off-shore well.

BACKGROUND OF THE INVENTION

At present, off-shore oil wells generally feed their output into a crude oil pipeline which stretches along the sea bed to a suitable point on the shore. Oil from the pipeline is then generally stored in large capacity storage facilities at or near the coast. The construction of land-based oil storage facilities and, more particularly, the construction of submerged crude oil pipelines involves very large capital expenditure. An aim of the present invention is to provide means for delivering oil from an off-shore well or wells (field) which do not require the construction of large sea bed pipelines to shore and which may obviate, or at least reduce, the requirement for construction of land based storage facilities.

SUMMARY OF THE INVENTION

According to one aspect of the present invention, there is provided an oil storage vessel which is provided with (a) a flexible hose for delivery of oil, one end of said hose being adapted for connection to the oil storage capacity of the vessel; and (b) a hose guide system which is constructed so as to receive and support said flexible hose, and which comprises (1) a travelling sheave adapted to allow the flexible hose to pass around it, the sheave being mounted on guide means for travel along a track extending generally along the axis of the vessel; (2) a first hose support channel positioned on one side of said track, for supporting the flexible hose between its connection with the oil storage capacity of the vessel and the travelling sheave; and (3) a second hose support channel, positioned on the opposite side of said track to said first hose support channel, for supporting the flexible hose between the travelling sheave and one end of the vessel, whereby the flexible hose can be supported in a generally U-shaped course defined by the first hose support channel, the travelling sheave and the second hose support channel between its connection with the oil storage capacity of the vessel and said one end of the vessel.

According to another aspect of the invention, there is provided apparatus for providing a deep water submerged mooring for a vessel at sea, which comprises a base located on the sea bed; a buoyant riser attached to said base by a universal joint; a fluid swivel connected to the top of the riser by a coupling; a hose guide tray attached to said fluid swivel; and a spacer buoy attached to said fluid swivel by a universal joint, such that the hose guide tray acts as a lever to facilitate rotation of the fluid swivel in response to movement of a hose passing over the hose guide tray and extending to said vessel, and wherein a chain beam and mooring chain are attached to said spacer buoy whereby said vessel can be moored to the apparatus.

According to a third aspect of the invention, there is provided a method of delivering oil from an off-shore well to the shore, which comprises the steps of (a) supplying oil from the well, or from a production facility associated with the well, to a floating storage vessel moored close to the well; (b) ferrying a service tanker from the shore towards the oil storage vessel; (c) tethering said service tanker to the oil storage vessel; (d) transferring oil from the oil storage vessel to said service tanker by means of a flexible hose connected at one end thereof to the oil storage capacity of said oil storage vessel and the other end of which extends directly or via hose extensions to the service tanker; (e) stabilizing the transfer of oil by causing said flexible hose to travel in a generally U-shaped course before it leaves the oil storage vessel, said course being defined by a first hose support channel, a travelling sheave around which the flexible hose passes, and a second hose support channel, said travelling sheave being mounted on guide means for travel along a track extending generally along the axis of the vessel, and being attached to a constant tension device whereby relative movement between the oil storage vessel and the service tanker can be accommodated through travel of the sheave along its track, thereby paying out a greater or lesser length of flexible hose in accordance with the separation at any given time between the oil storage vessel and the service tanker; (f) disconnecting the supply of oil when a predetermined quantity has been transferred to the service tanker; and (g) ferrying said service tanker back to the shore.

DESCRIPTION OF THE PREFERRED EMBODIMENTS

Oil is preferably supplied continuously to the oil storage vessel and removed therefrom in batches (by way of the service tanker). The oil is preferably supplied directly to the oil storage vessel from a submarine well head; it may, however, be supplied to the vessel from an oil production platform.

The floating storage vessel will generally be moored to a location on the sea bed at or near the wells by means permitting the vessel to adopt a position in accordance with prevailing weather conditions; the mooring may be effected by several anchor chains or by other bottom-linking systems. It is preferred to use a submerged mooring arrangement, advantageously in the form of a buoyancy chamber linked to a gravity and/or piled base for shallow water depths or a buoyancy chamber linked to a bouyant riser column or columns which in turn is or are linked to a gravity base for deep water depths. The "mooring chain" in both the shallow water and deep water systems is attached to the topmost buoyancy chamber called a "spacer buoy" and is passed into the ship at a point along the keel. The "mooring chain" may be a mooring line constructed completely with chain or it may be a combination of chain and wire rope. The importance of the chain lies in its weight and tension alteration capability with changes in catenary length and shape. A procedure of moooring a vessel at sea, using such apparatus, is also provided. Dynamic assist propulsion may be employed if necessary by the storage vessel to ease inordinate strain on the mooring and to keep the vessel in the most accommodating attitude relative to a complex sea where wind wave and current create difficult circumstances. Three reference means are preferably available to keep the storage vessel, e.g. a ship, in position relative to the mooring.

For shallow and deep water applications the yaw attitude and excursion of the storage vessel are preferably accommodated in the hose connections at the storage vessel (e.g. ship) to avoid twisting of the hose(s).

This can be done in the case of a single riser or single submarine hose by a rotating seal or as described below. Where multiple hoses are used, a rotating plate built into the ship above the water line may be employed. The risers or submarine hoses are connected to suitable connecting ports on the underside of the rotating plate. Flexible helically coiled hoses are attached to connecting ports on the topside of the rotating plate. These flexible hoses form an orderly helical arc. There will be enough flexibility in the curvature and bending of the hoses to allow the ship to turn in disorientation from the rotating plate 90° to starboard and 90° to port without the use of hose rotating seals. Where shallow water mooring facilities are used oil will pass into the gravity or piled base and to the fluid swivel mounted immediately above through which it will pass to a hose or hoses and thence to the storage vessel. Where deep water mooring facilities are used (generally over 180 feet water depth) oil will pass from a manifold on the seabed, through a flexible pipe to the riser above the gravity or piled base. It will then pass either through the riser or in a pipe attached to the riser along the riser's length. At the riser top it will pass into the fluid swivel and out to a flexible hose(s) and thence to the storage vessel. There is one articulated joint in the preferred shallow water system and two or more articulated joints in the preferred deep water system. The fluid swivel is constructed above the gravity and/or piled base of the shallow water system and at the top of the riser in the deep water system. In both cases the fluid swivel is located at air dive depth, advantageously. Before hook-up to the storage tanker the mooring chain may hang vertically from the top of the chain beam on the spacer buoy; its end is attached to a pendant line and surface marker buoy. The submarine hose(s) attached to the fluid swivel advantageously hang(s) in a catenary with its probe end(s) held at the 70 foot water depth below SWL by a pendant line and marker buoy.

A section can be added to either the shallow or deep water system so that it will penetrate the surface. In this case the added section is preferably flanged to the spacer buoy and the mooring shackle is attached to the top of the added section. With such a surface penetrating section a floating mooring rope rather than chain beam and chain is preferably used. The reason for incorporating this duplicity is so an oil operator can use service (ferry) vessels only, in the initial and latter production phases of a field development, and can use a storage vessel when the quantity of oil production warrants such a vessel.

In shallow water depths a preferred arrangement for mooring the floating storage vessel employs a chain pipe built into the vessel which guides the chain to a winch mounted in the forecastle head. The chain pipe is advantageously bell mounted to distribute the mooring loads and can be located between the bows and the centre of gyration of the vessel. The vessel will then be capable of rotating or "weather-cocking" about the mooring chain pipe in response to changing weather conditions.

In deep water environments a preferred arrangement for mooring the floating storage vessel employs a spindle cylinder built into the vessel, which cylinder houses the mooring equipment, submarine hose-handling equipment, and diving equipment. The spindle cylinder in the ship is emplaced at a suitable position, generally somewhere between the bows and ⅓ aft, most desirably just forward of the centre of gyration. The vessel will then be capable of rotating, or "weather-cocking" about the chain pipe in the spindle cylinder in response to changing weather conditions.

The manifold on the sea bed is attached to the oil line at the riser above the bottom articulated joint which joins the riser and weighted base. The hose guide tray for the hose passing from the fluid swivel is balanced and/or supported. Before hook-up to the tanker, the mooring chain hangs vertically from the chain beam at the top of the spacer buoy; its end is attached to a pendant line and marker buoy. The submarine hose attached to the swivel hangs in a catenary with its probe end held at the 70 foot water depth by a pendant line and marker buoy. The spacer buoy in both the shallow and deep water systems is specially sized and shaped for optimum drag and restoring forces and is ordinarily submerged. A section can be added to it so that it will penetrate the surface. In this case the added section is preferably flanged to the spacer buoy and the mooring shackle can be attached to the top of the added section. With the surface penetrating section a floating mooring rope rather than chain is preferably used. The reason for incorporating this duplicity is so an oil operator can use service (ferry) vessels only, in the initial and latter production phases of a field development, and can use a storage vessel when the quantity of oil production warrants such a vessel.

The floating storage vessel can get onto the submerged mooring unaided once it is ascertained that the submarine hose has not, through water current action, wrapped itself around the vertically hanging mooring chain.

In the shallow water system, the storage vessel will approach the mooring between the marker buoy for the hose and the marker buoy for the mooring chain. The mooring chain buoy and pendant line will be hauled aboard one side of the ship and stowed. The mooring chain will be attached to a continuos wireline which passes around the hull on fairleads and into and through the mooring chain pipe. When the chain reaches the top of the mooring chain pipe it will be passed over a windlass and the excess chain stored in a chain locker. The buoy and pendant line marking the submarine hose will be hauled aboard on the other side of the storage vessel just forward of the hose sheave system which is preferably mounted on the gunwale of the vessel. A strayline travelling the length of the sheave system from the onboard oil manifold and through the hose guide stinger will be attached to the hose presently snubbed to a bollard at the gunwale. The hose will be lowered and passed through the hoseguide stinger, over the sheave and along the track to the manifold where its probe will be connected to the receptacle. Depending on how many fluids are being passed from/to the mooring fluid swivel a multiple hose system using hose sheave systems on both sides of the shipe can be employed. In the deep water system, the storage vessel will approach the mooring between the marker buoy for the hose and the marker buoy for the mooring chain. The mooring chain buoy and pendant line will be hauled aboard e.g. on one side and stowed. The mooring chain will be attached to a continuous wireline which passes around the hull on fairleads and into and through the mooring pipe. When the chain reaches the top of the mooring pipe it will be secured while the end is passed over a windlass. The excess chain is stored in a chain locker. The buoy and pendant line marking the submarine hose will be hauled aboard e.g. on the other side. Likewise, the hose or hose bundle will be attached to a continuous wireline which passes around the hull on fairleads and into and through the hose pipe. When the probe end(s) of the hose(s) reaches its/their receptacle(s), the connection(s) will be secured.

In both the shallow and deep water systems the length of mooring chain in the water will be dependant on the weather conditions and vessel draught. In the shallow water system the length of hose in the water is adjustable while in the deep water system the length of hose in the water remains fixed.

The means for transferring oil from the storage vessel to a service (ferry) tanker preferably comprises (1) a manually or automatically controlled tension releasing (self rendering) mooring winch, a mechanical damping deivce and line and (2) one or two oil hoses. The mooring line is preferably provided with a "colour coding" so that the length of line paid out at any given time can be seen from the colour(s) visible. The line is attached on the service tanker using a tugger winch and/or stopper. The oil transfer hoses pass over suitably elevated "A" frames and hang in catenaries between the "A" frame tops and the bows of the service tanker. Other arrangements may be employed if desired. The oil lines from the "A" frames may be of fixed length in system "a" or of varying length in system "b". Other arrangements may be employed such as a single jib mounted on a rotating table.

In system "a" the oil piping transports the crude oil from the pumproom to the base of the "A" frame(s) where there is a flexible joint, for example a chicksan joint. The oil pipe continues up the "A" frame where there is another flexible joint, for example a chicksan joint, half way or thereabouts along the A frame. The flexible oil hose follows the curved radius surface over the top of the A frame apex and forms a catenary between it and the bows (and receiving receptacle) of the service (ferry) tanker. The shape of the oil hose catenary and adjustment for the "catenary in water" or "catenary in air" modes can be accommodated by lowering or raising the "A" frame apex to suitable elevations.

The A frame for system "a" and system "b" is identical for all intents and purposes. It is a structure with each leg hinged about halfway along its length so that one part of the A frame can be folded back on top of the other part using hydraulic cylinders mounted at each leg to effect the easing down of one part on the other. In the extended position the A frame may be raised and lowered either hydraulically or by block and tackle incorporating a stiff leg. At the apex of the A frame a curved tray of a suitable radius for bending hose and a flair to allow lateral hose movement is constructed.

In system "b" the oil piping transports the crude oil from the pumproom to a deck manifold just forward of the superstructure. Flexible pipelines (oil hoses) themselves are preferably fed out from the manifold in static troughs to sheaves (crossheads) which are constructed so that they can move in fixed tracks forward and aft along a selected length of the floating storage vessel, and under the influence of self-tensioning devices, for example self-tensioning winches. The two or more flexible pipelines and associated facilities may be provided on the floating storage vessel so as to increase the rate of delivery of oil therefrom or to use one hose to pass oil to the service tanker and to pass dirty ballast water from the service tanker to the floating storage tanker where the ballast water would be processed.

The oil storage vessel may be provided with a standpipe oil pipe arrangement connected to the manifold from the flexible hose as an alternative to the sheave mounted on guide means which is preferably attached or attachable to a constant tension device and in use connects the manifold with flexible hose to the ferry tanker.

Where a sheave is employed, it is preferably constructed and located so that the oil hose can be passed around the sheave and be fed out from the storage vessel, preferably under constant tension, during which process the sheave and its guide means move in or on said track.

Preferably, the guide means for the sheave is in the form of a sled. The sheave is advantageously provided with hose guide apparatus to control the run of the hose around the sheave.

For a better understanding of the invention, and to show how the same may be carried into effect, reference will now be made, by way of example, to the accompanying drawings, in which:

FIGS. 1 and 2 show respectively a schematic plan view of a floating oil storage vessel in accordance with the invention, and an isometric view of part of the vessel;

FIG. 3B illustrates in greater detail the oil transfer arrangement shown in FIG. 3A;

FIG. 3C illustrates diagrammatically a spindle cylinder mooring arrangement forming part of the oil storage vessel and designed for deep water environments;

FIG. 5 illustrates a shallow water submarine hose handling system from the mooring to the storage ship;

FIG. 6 illustrates a surface penetration modification of the system shown in FIG. 5;

FIG. 7B illustrates diagrammatically how the mooring condition of FIG. 3C is achieved; and FIG. 8 shows on an enlarged scale part of the system illustrated in FIGS. 5 and 6.

Figure 1:
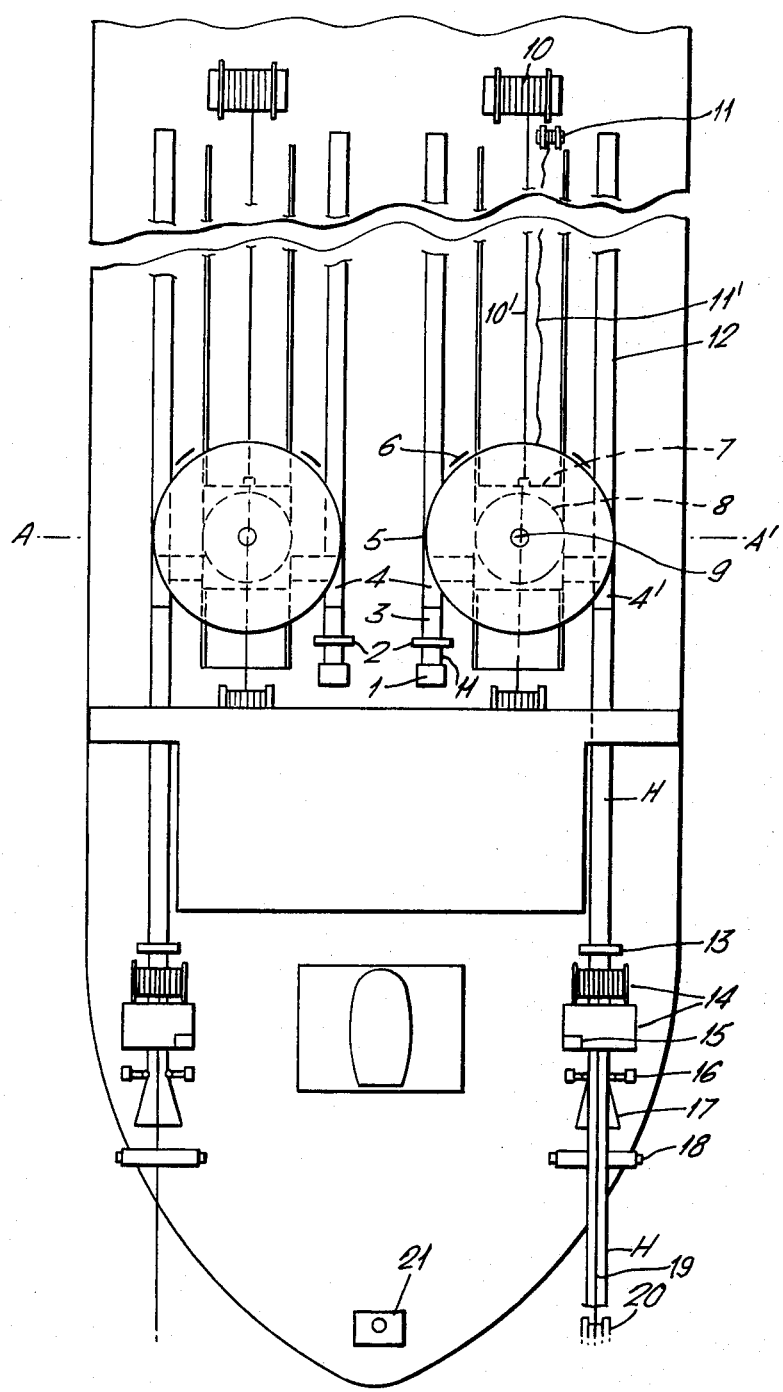

Referring first to FIGS. 1 and 2 of the drawings, the oil storage vessel which is preferably of 210,000 to 255,000 tons is provided with a manifold 1 which is the outlet for oil from the vessel's tanks via the pump room. In system "a" an oil pipeline H is attached to the manifold 1, and passes through or about a number of structures before attachment to the flexible oil hose which passes over the apex of the A frame.

In system "b" an oil pipeline H is attached to the manifold 1 and a flexible hose passes in a "static" trough 3 to a controlled sheave (crosshead) 5 and thence into an "active" trough 12 to and over the stern erected A frame. The manifold is built to a height so the continuing pipe in system "a" or the hose in system "b" does not require an unnecessary bend.

In system "b" the trough 3 is deep enough to hold whatever diameter hose is being used. The hose H passes out of the trough 3 and around a sheave 5 which is mounted on a guide sled 7. A hose guide tongue 4 is provided to enable the hose to be guided out of the static trough 3 and onto the sheave 5, or vice versa. The hose guide tongue can take the form of concave shell with spindle bearings along which the hose can slide, the bearings being held to a foot which slides in the bottom of the static trough 3. A similar hose guide tongue 4' is provided on the other side of the sheave 5, and serves to let the oil hose into a second hose trough called an active trough 12.

The hose sheave can be mounted upon the guide sled by means of a ball and race arrangement 8. The diameter of the hose sheave 5 is generally determined by the most severe bending radius that can be accommodated by the oil hose. The tangential edge of the sheave circumference is positioned as close as possible to the hose troughs 3 and 12 so as to minimise distortion and wear of the hose. When the sheave is not in use, it may be mechanically secured to the structure of the vessel.

The guide sled 7 comprises a frame mounted on wheels which are guided by two rails 50 which lap over the top of the wheels. The hose guide tongues 4 and 4' are attached to the guide sled 7. Additionally, brake shoes 6 are attached to the guide sled and serve firstly to prevent the hose from jumping out of the sheave 5, and secondly to act as an emergency braking system in the event of an operational failure, for example loss of tension in the constant tensioning devices to be described hereafter, or fracture of the oil hose.

A self-tensioning winch 10 is provided on the vessel, and is connected via a wire 10' to the guide sled 7 when the oil delivering apparatus is in use. The winch 10 ensures that the sheave 5 is held at substantially constant tension when oil is being delivered through the hose H, and also provides the motive power for movement of the sheave 5 along the rail track 50 when oil delivery via the hose H is complete, and the hose is being drawn in from the service tanker. An auxiliary winch may be provided to assist movement of the sheave 5 in the opposite direction if required.

An axle 9 passes through the sheave 5 and the guide sled 7, and acts to lessen the stress on the ball and race 8 as pressure is exerted on the sheave 5.

The brake shoes 6 may be operated by any convenient mechanism. In one embodiment, a hydraulic line 11' which is fed out from a further winch 11 is used to actuate the brake shoes 6. The hydraulic line is not self-tensioning, and the winch 11 is operated so that it cannot pull tight, thus preventing a danger of breaking the hydraulic line, this being made possible because of its low overload rating.

The active hose trough 12 include concave spindle bearings in the base of the trough and cylindrical roller bearings along the side walls of the trough. These are provided to lessen friction between the hose and the trough 12, but are not required in the case of the static hose trough 3 because there is no relative movement between the hose H and the surfaces of the trough 3. The trough 12 extends along the vessel from the location of the sheave 5 and its associated track to that part of the vessel from which the flexible oil hose is paid out. The end of the trough 12 remote from the sheave 5 is provided either with a flared hose exit 17 at deck level (see FIG. 1) or with an "A" frame over the apex of which the hose passes (see FIGS. 3A and 3B). Such an "A" frame facilitates passage of the hose and allows for a disorientation of more than 34 degrees port and starboard between the floating storage vessel and a service tanker to which oil is to be supplied. The "A" frame is constructed so that half of it can fold back on the base section through the use of a hinge which can be locked or unlocked, using a block and tackle with a stiff leg and the use of two hydraulic cylinders which will allow the top section to be gently lowered on the base section. In the folded over position the equipment can be considered stowed and maintenance can be performed on the top section. At the top of the "A" frame, the radius of curvature accommodates the bending radius of the hose and this section is flared to allow the hose to move laterally within limits off the apex center without constricting or binding the hose. This accommodates excursion of the service tanker. The length of the extended and locked "A" frame is dependent on the space available at the aft end of the ship and the amount of overhang permitted of the folded "A" frame over the stern of the ship. A horizontal bollard 13 (see FIG. 1) over the hose and trough is provided forward of the "A" frame base in system "b" and serves to keep the oil hose in the trough 12. The mooring equipment need not be located in the position as shown in the drawing. The mooring equipment includes a tension releasing, self rendering and/or a manually controlled device for a mooring line, for example a winch and a damping roller. Where the hose is passed to the service tanker by the use of the mooring line as a guide, a plurality of blocks may be provided each with an associated clamp, the blocks riding along the mooring hawser in use, and the clamps serving to fasten the oil hose, through the blocks, to the mooring hawser. The blocks and clamps can be stored in any suitable position when not in use; this is indicated for convenience as 15 in FIG. 1 of the drawings.

In the embodiment shown in FIG. 1, the hose passes through one or several pairs of vertical hose bollards 16, which may be located in the region of the flared hose exit 17. These bollards 16 can take the form of vertical rolling cylinders which maintain spring compression on the hose. It is envisaged that the bollards will be about six feet high. The bollards should be fabricated from a material which is able to grip the hose material adequately without damaging the hose. Instead of rolling cylinder bollards, concave spindles may be provided in order to give a firmer grip on the hose and thereby to prevent vertical movement.

In FIG. 1 of the drawings, the mooring hawser is indicated generally as 19, and a single block and clamp 20 is shown. The blocks are lightweight structures attached to run freely on the mooring hawser. The clamps may be attached to their respective blocks by a rod with a limited action pivot at the block. The clamps can be of the quick-fit adjustable type which grips the oil hose. The material on the inside of the clamp should be such that adequate grip of the hose takes place without wear.

Before passing from the floating storage vessel, the oil hose H in system "b" passes over one or more roller(s) 18 which serve(s) to protect the hose from hitting the gunwale of the ship and to avoid abrasion and undue stressing of the hose when there is considerable movement in rough weather. Similar rollers may be located at the apex of the "A" frame.

Figure 3A:
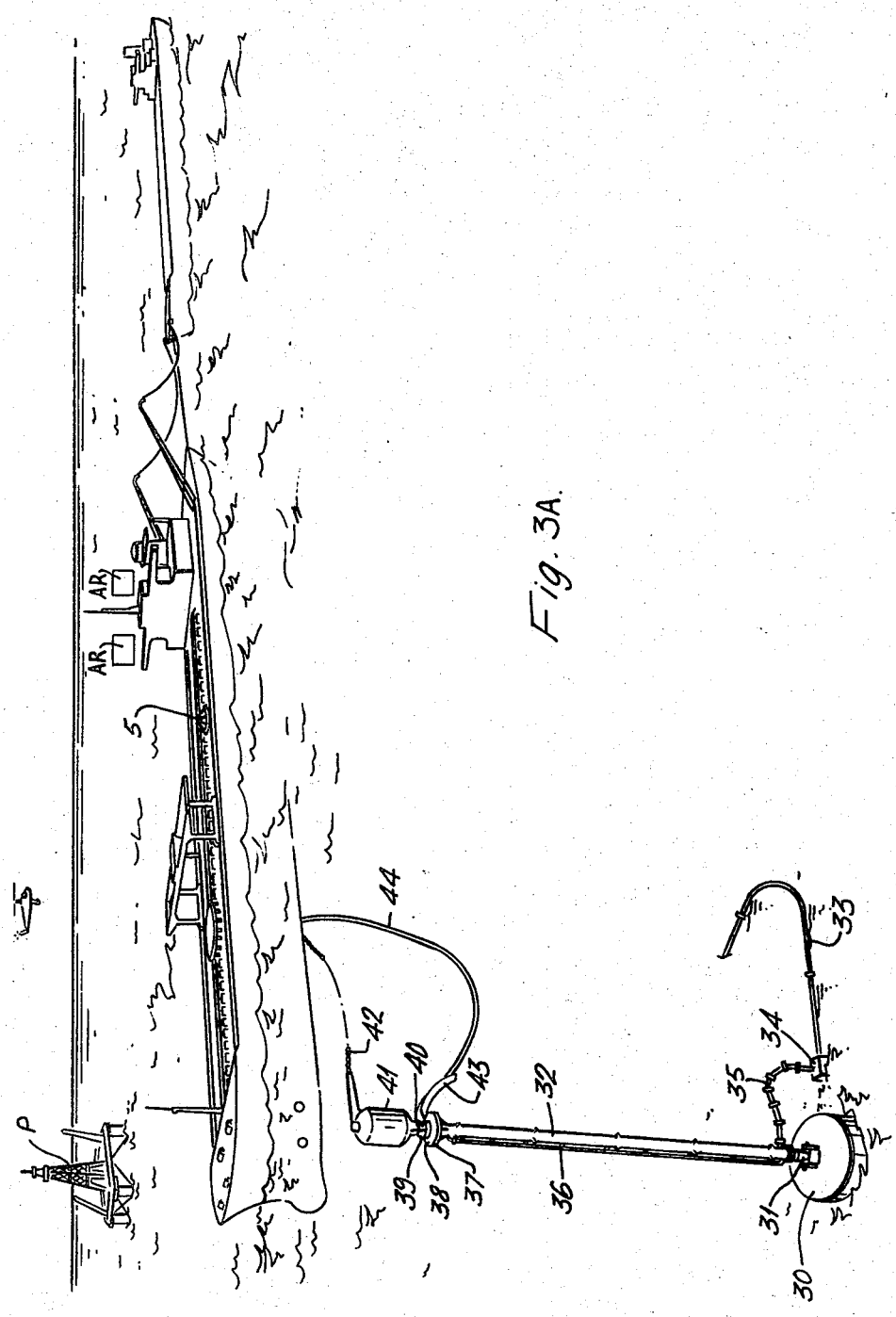
FIG. 3A illustrates a deep water mooring system and part of an oil transfer arrangement.

In the embodiment of oil storage vessel shown in FIGS. 3A and 3B, the hose H is freely suspended from the apex of the "A" frame and across to the service tanker. The catenary can be adjusted so it is completely in air or passes through the sea.

An alternative arrangement (illustrated in phantom in FIG. 3B) is for the oil transfer hose to be totally submerged between the oil storage vessel and the service tanker. Other hose handling arrangements may also be adopted where desired—e.g. involving the use of cranes.

The floating storage vessel also includes strayline equipment 21 and means for either streaming the lines on the sea surface astern of the storage vessel or projecting the lines in air astern of the storage vessel for example by a telescopic jib. The stayline may be thrown by a gun. A cage may be provided to protect the strayline thrown position.

One preferred mooring system for shallow water use with the invention is illustrated in FIG. 5. The mooring system comprises a base 30' located on the seabed to which a fluid swivel 39' is attached. This is connected to a universal joint which in turn is connected to a spacer buoy 41' atop which is a chain beam 42'. An oil pipeline located on the seabed is connected (directly or via a manifold) to the base 30'. The shape of the spacer buoy can be varied from the generally cylindrical structure shown in FIG. 5. A hose guide tray such as that shown in FIGS. 3A and 7A may be attached to the fluid swivel in a balanced and/or supported condition. The tray ensures that the hoses(s) clears the mooring base and that enough leverage force is available to rotate the fluid swivel as required. The oil hose(s) 44' lie in the hose guide tray and serve to supply oil to the storage tanks in the storage vessel. If desired, the spacer buoy 41' can be extended upwardly to the surface by an extension 45'; this arrangement is shown in FIG. 6.

Unlike the deep water system where the submarine oil hose passes up through a hose pipe in the ship and the length of hose in the water is of fixed length, the shallow water system provides for the submarine hose 44' to be hauled up at the side 60 of the ship through a stinger 51 to a vertically positioned sheave 52 which slides in rails 53 along the side 60 of the ship (see FIG. 8). The position of the sheave controls the amount of hose in the water thus enabling, within limits, adjustment of the hose catenary to relate to the length of mooring chain from the storage vessel to the mooring. Rollers 54 are provided to smooth the passage of the hose towards the sheave 52. At the ship the hose runs over the sheave 52 and along rollers 55 to the midship's manifold where its probe end is connected to a quick release receptacle.

One or more hoses can be handled in this way from one or both sides of the storage vessel. The spacer buoy of the mooring is located sufficiently deep to be free from severe wave action and provide the optimum chain scope ratio parameters from the mooring to the ship.

One preferred mooring system for deep water use with the invention is illustrated in FIG. 3A. The mooring system comprises a base 30 located on the sea bed, to which a buoyant riser tube 32 is attached by means of a universal joint 31. An oil pipeline 33 located on the sea bed extends from a submarine oil well or associated production facility P and is connected, via manifold 34 and flexible bottom hose 35, to oil line 36 which is located aside or inside the riser 32. At the top of the riser there is a platform 37 located about a coupling 38 on top of which is a fluid swivel 39 which is coupled to a universal joint 40. A spacer buoy 41 is attached to the universal joint 40, and a mooring chain 42 extends from a chain beam which can rotate in two axes on top of the spacer buoy to the oil storage vessel. The shape of the spacer buoy can be varied from the generally cylindrical structure shown in FIG. 3A. A hose guide tray 43 is attached to the fluid swivel 39 and provides a channel through which oil hose(s) 44 is/are conveyed. The hose guide tray is supported or balanced and also serves as a lever arm to rotate the fluid swivel. This hose serves to supply oil from oil line 36 to the storage tank in the storage vessel. The spacer buoy is located sufficiently deep to be free from severe wave action.

The connection between the mooring system of FIG. 3A and the oil storage vessel is illustrated in FIG. 3C which shows a partial section along the longitudinal axis of the oil storage vessel. A spindle cylinder C is built into the oil storage vessel at a suitable position, generally somewhere between the bows and ⅓ aft, most desirably just forward of the center of gyration. The spindle cylinder includes a bell-mouthed mooring tube T, through which mooring chain 42 extends to be secured to the vessel, and space C for diving equipment. A bell-mouthed tube T' is provided in the spindle cylinder C and serves to receive the oil hose 44 for connection to the oil storage tank (not shown) in the storage vessel.

Figure 7A:
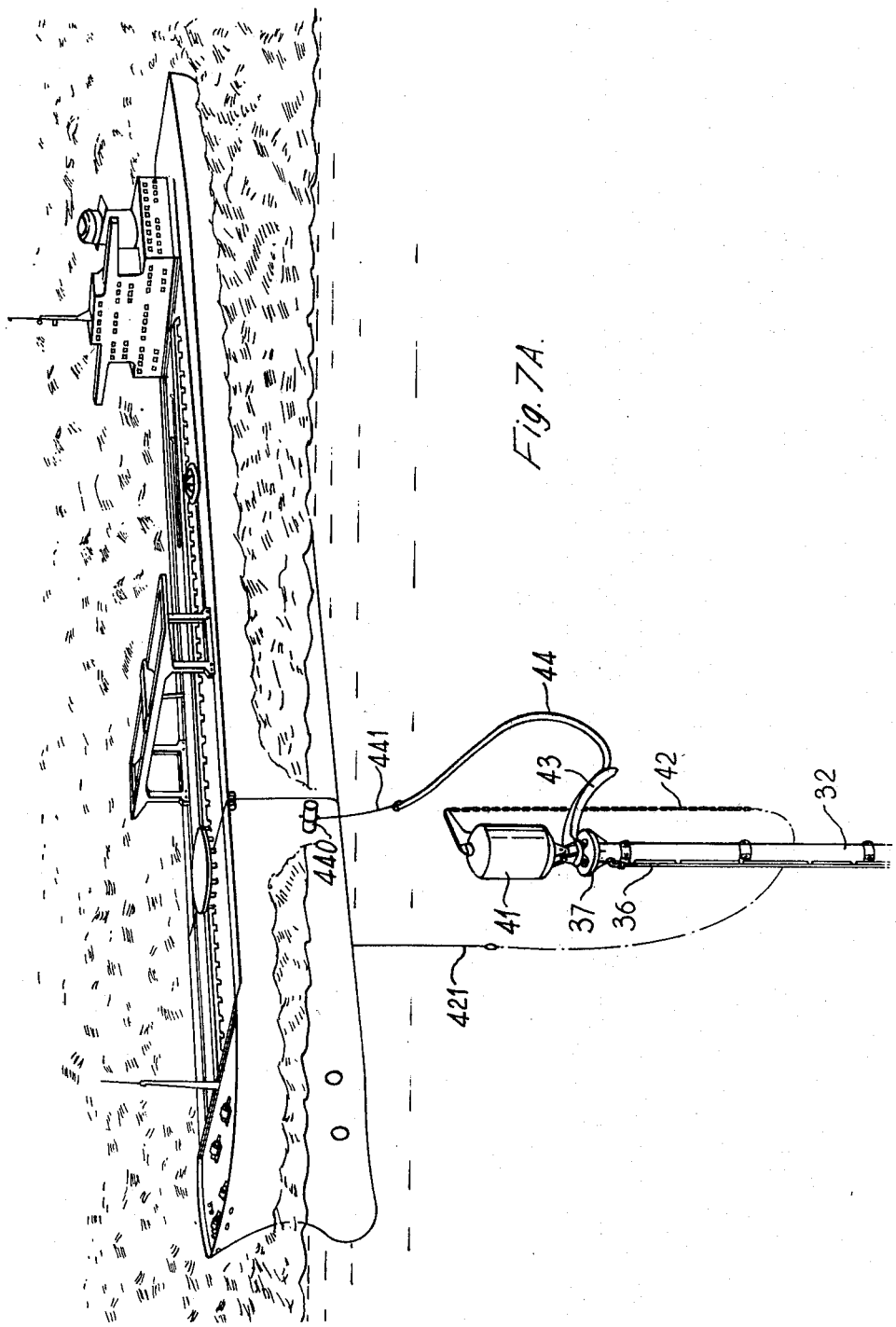
FIG. 7A illustrates the condition of the mooring system of FIG. 3A in greater detail at the moment immediately prior to its connection to the oil storage vessel.

The condition of the mooring system of FIG. 3A immediately prior to its connection to the oil storage vessel is illustrated in FIG. 7A, in which the same reference numerals are used for parts of the mooring system as are used in FIG. 3A. The oil storage vessel is positioned between two marker buoys only one of which (440) is visible. Marker buoy 440 is connected to oil hose 44 by a pendant line 411. The other marker buoy (which is on the far side of the vessel and thus not visible in FIG. 7A) is similarly connected to mooring chain 42 by a pendant line 421. After being positioned in the orientation shown in the orientation shown in FIG. 7A, the oil storage vessel is moored via mooring chain 42, and the hose 44 is connected to the storage capacity of the vessel, as described hereinbefore.

FIG. 7B is a transverse section through part of the oil storage vessel and illustrates how the connection shown in FIG. 3C is brought about. After the vessel has been positioned as shown in FIG. 7A, the mooring chain 42 is attached to a continuous wireline 422 which passes around the hull of the vessel on fairleads 423 and into and through the bell-mouthed chain pipe or mooring tube T provided in spindle cylinder C. The wireline 422 is moved in the direction of the arrows, and when the chain 42 reaches the top of tube T it will be secured while its end is passed over a windlass 424. Similarly, the end of oil hose 44 is attached to a continuous wireline 442 which passes around the hull of the vessel of fairleads 443 and into and through the tube T' of FIG. 3C (Tube T' is not visible in FIG. 7B), In the embodiment shown in FIG. 4, the spacer buoy is modified to alter its capabilities and is extended up to the surface by means of a cylindrical element 45. This is connected above the waterline by a mooring 46 to the bows of the oil storage or ferry vessel. This modification applies to both the shallow and deep water moorings.

The storage capacity of the floating storage vessel may be as large as required, the aim generally being to allow constant input of oil from the oil wells to the floating storage tanker while allowing batch delivery of oil from the floating storage vessel to service tankers. It is envisaged that the service (ferry) tankers will have a capacity of from 80,000 to 100,000 tons, though smaller vessels, for example of 60,000 ton capacity, may be more useful in certain instances.

It is envisaged that the floating storage vessel will ordinarily have about 26,000 to 28,000 horsepower capacity in its main propulsion plant. The vessel may be provided with "dynamic assist" propulsion in order to ease mooring stresses built up by its motion and excursion movement and to keep the vessel in the optimum equilibrium position relative to the applied forces.

Dynamic assist differs from dynamic positioning in that its function is not to keep the ship over one fixed static location on the sea bed. Dynamic assist will utilise any one or several of a large number of selected points and headings given certain environment criteria, mooring parameters, and vessel draught and size.

In addition to acting as the main oil storage vessel, the floating storage vessel may also be used to provide the crude production facilities in cases where subsea well completions are used. Facilities for scrubbing the oil before trans-shipment to a refinery may be included on the floating storage vessel. Use of a storage vessel as described may possibly allow oil production without the use of a production platform self-supporting or floating structure.

The presently envisaged procedure for supplying oil from the floating storage vessel to a service tanker will now be described with reference to FIG. 3A and 3B. Firstly, a service tanker will steam on a safe heading to within 200 feet of the storage tanker. The service tanker has already picked up the floating or thrown strayline from portion 21; alternatively; the strayline may be passed at this stage by a telescoping jib mounted under one of the "A" frames (see FIG. 3B). The mooring hawser 19 and chafing chain 19' from the floating storage vessel, attached to the stray line, is hauled across to the service tanker. At this stage, in system "b" the sheave 5 and guide sled 7 together with the oil hose H will be in the forward position towards admidships as shown in FIG. 3A. In system "b" the 150 feet or so of hose is secured on the fan tail of the storage vessel. When the mooring hawser is secured, the service tanker will stay in a position approximately 150–250 feet astern of the floating storage tanker, depending on weather conditions, ferry vessel cargo and hose length, for safety. Once a suitable distance between the floating storage vessel and the service tanker is attained, the service tanker, where propeller control is fine enough, operates its reverse power to provide a given stern thrust or mooring line tension and thus avoid snatch loadings. A stray line, attached to the mooring hawser and attached to the delivery end of the oil hose H or of a hose extension H' is then pulled across slowly by the service tanker, carrying with it the oil hose H or extension H'. During this process, with system "a" the hose is gently lowered from its stowed location, into the water and hauled to the service (ferry) ship. With system "b", the sheave 5 moves from the midships area of the floating storage vessel in the general direction aft towards the storage tanker stern. As the oil hose is paid out from the trough 12 and is passed by suspending it on the mooring line, clamps 20 are fitted about its circumference at regular intervals, the clamps then being carried along by their associated blocks which ride freely along the mooring hawser. Once the oil hose is aboard the service tanker, a quick release coupling is stabbed into a receiving port in the service tanker to complete the oil flow line. Where an "A" frame is used the hose passes from the trough 12 over the "A" frame which has a built-in continuation of trough 12 and a suitable radius of curvature over the "A" frame apex. The oil hose is hauled aboard the service tanker and a quick release coupling is stabbed into a receiving port. The sheave 5 is then tensioned by the winch 10 so that the oil hose is held at a constant tension. Under these conditions, the connection between the floating storage vessel and the service tanker is resilient, and may allow for an extra 150 feet separation movement between the vessels. Lateral drifting of one vessel relative to the other is tolerable as far as the hose is concerned where the bow of the service tanker does not move laterally from the longitudinal axis of the storage vessel more than one hundred feet to port or one hundred feet to starboard. Oil is pumped through the oil hose from the tanks of the floating storage vessel to those of the service tanker. Once delivery is complete, the sequence of events just described is reversed so that the oil hose is withdrawn from the service tanker and its length, which may be up to 1000 feet, is accommodated by movement of the sheave 5 along its track in a direction away from the service tanker.

For more rapid delivery of oil, the floating storage vessel is provided with a double delivery system as shown in the drawings. The oil hose may advantageously be up to 20 to 24 inches in diameter, which allows a high rate of oil transfer. Each of handling and ferry tanker capability, however, may dictate 12 inch lines.

Delivery of oil from line 33 on the sea bed into the oil storage vessel may take place continuously; thus, problems associated with sudden changes of pressure in the oil lines may be eliminated.

One method of installing the mooring arrangement shown in FIG. 3A will now be described by way of example.

After the base and riser are in place, the "assembly" consisting of the flanged or Grayloc-Type coupling fluid swivel, hose guide tray universal joint and spacer buoy will be connected to the riser separately or together in the following manner utilising either an anchored barge, a dynamically-positionable service vessel or a dynamically-assisted storage tanker which eventually will be moored to the mooring. An extendable gantry with an outreach from the vessel of 25–30 feet and large enough to lift and move the assembly singly or in pieces is employed. This gantry will be used to swing into a vertical attitude the pieces or assembly in a controlled fashion utilising winches and a "tipping sled", which is mounted on guide rails and which position is controlled by a winch. (This sled can be the sled 7 shown in FIGS. 1 and 2). In the vertical position, the top of the spacer buoy is captured in a frame to avoid oscillations. Guide wires from 2 self-tensioning winches or other heave compensating devices are passed from their respective sheave positions on the gantry frame through carabiner-type fixtures which are fixed to the spacer buoy. Two divers take these wires down to the diving platform on top of the riser and fix them in predetermined positions opposite each other. The wires are tensioned by self-tensioning winches or other tensioned devices.

Two openable ports with adjacent valves on the spacer buoy have by this stage been opened, one at the bottom of the buoy and the other at or near the top. In the buoy construction itself there is a specially constructed buoyant section not affected by the internal buoy space open to the two ports. The special buoyant section serves the purpose of keeping the assembly vertical when in the water but does not keep the assembly buoyant i.e. it provides no positive buoyancy for the spacer buoy or complete assembly.

As the assembly is lowered in the water, slowly to allow the ingress of water and to expel air from the buoy main body, it is guided by the two taut wires attached to the diver's platform 37 at the top of the riser. With communication to the surface, the divers control the final descent and stabbing of the assembly to the riser. The flanged or Graylock type coupling is made fast. The line used to lower the assembly is made slack. The top port on the spacer buoy is closed and a predetermined quantity of water is expelled through the bottom port by pumping air into the spacer buoy utilising an airline from the surface. The lifting/lowering wire is separated from the buoy, and the two guide wires are detached from the carabiner type guides on the buoy. The bottom port is positively closed. The chain is lowered and attached to the spacer buoy. The oil hose is lowered and attached to the swivel. The guide wires are utilised to lower both the chain and the hose. The guide wires are disconnected from the diver's platform. The type of vessel on the surface which assists in the attachment of the assembly dictates the final procedure of attachment of pendant lines and marker buoys or chain and hose attachment to the mooring and hose positions in the storage tanker.

The assembly, once in position, will be ordinarily maintained by an air diving team from the floating storage tanker which is moored to the shallow or deep water mooring. When major overhaul or replacement of parts are required that cannot be accomplished under water or the mooring is being disassembled, the assembly can be lifted to the surface and put aboard ship either by an anchored barge, a dynamically-positionable service vessel or the dynamically-assisted storage tanker which has been moored to the mooring. In the case of the anchored barge or the dynamically-positionable service vessel, the mooring chain and oil hose are disconnected from the storage tanker and attached to pendant wires having marker buoys; the mooring chain hangs straight down along the side of the mooring and the oil hose hangs in a catenary. In the case where the dynamically-assisted storage tanker is going to lift the assembly, the mooring chain and oil hose do not have to be disconnected from the ship.

Two divers take down the guidewires which are attached to the diver's platform. They pass the wires through the carabiner-type fixtures which are part of the spacer buoy. The oil hose and chain are disconnected at this time and lifted to the surface. The lifting line is attached to the top of the buoy and hung loosely. The oil line on the riser will be closed or will have been closed before any lifting procedures commence re the hose, chain or assembly. The main body of the spacer buoy is flooded using a water ingress valve and an air valve at the bottom and top, or near top, respectively of the buoy. There is enough buoyancy in the specially constructed buoyant section at the top of the buoy to keep it upright. When the main body is filled with water, the two large ports, one at the top and one at the bottom are opened. The Graylock-type or other flanged coupling under the fluid swivel is loosened and the slack in the lifting line is made taut. The assembly is lifted to the surface whereupon water will automatically drain from the spacer buoy as the assembly is lifted clear of the water. At the top of the lift the buoy fits into a capture frame to avoid oscillations. The guidewires are disconnected from the carabiner type fixtures on the buoy and they are also disconnected from the diver's platform on top of the riser. A marker buoy is floated to mark the riser position. The gantry holding the assembly is retracted inboard until the assembly is in a position to be secured to the "tipping sled", which is in a semi-vertical position. When secured, the tipping sled is lowered to the horizontal position. The lifting line is detached from the assembly. The tipping sled is guided inboard on its rails to where maintenance on the assembly can be carried out or parts replaced. Lifting tackle on the gantry is available to move the large pieces of the assembly about.

When required, e.g. in an emergency, the submarine hose will automatically disconnect or be passed through the bottom of the ship using the continuous wire, hung in a catenary, and be identified by a surface buoy released over the side of the ship. The mooring line secured at the windlass will be released and pass through the hawser pipe and be marked by the surface buoy attached to the chain by a pendant line. The chain hangs in a vertical attitude.

Figure 4:
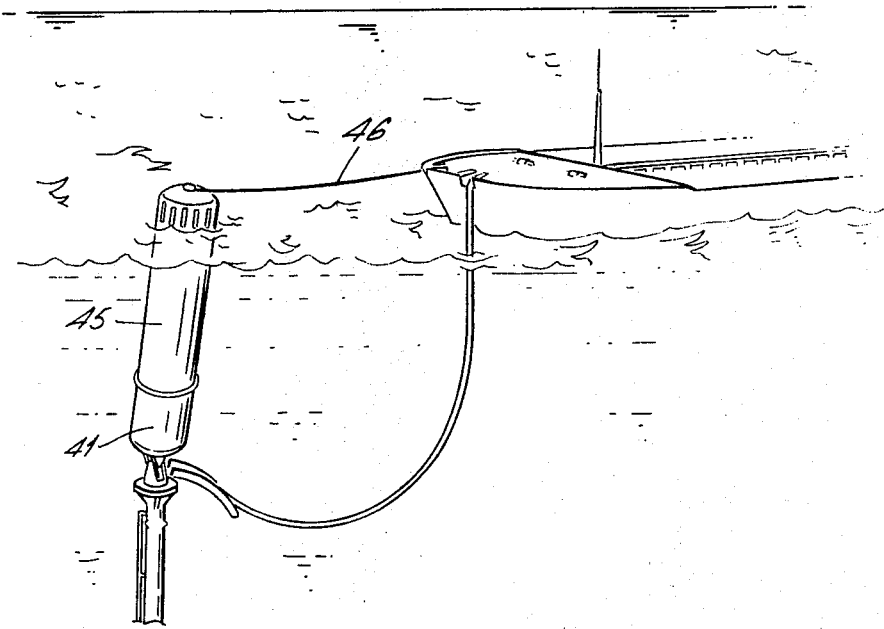
FIG. 4 illustrates a surface penetration modification of the mooring shown in FIG. 3A.

In one embodiment of the invention, the spacer buoy is constructed so that it can be modified to give the structure as shown in FIG. 4. This involves a two-part construction the upper part of which can be changed to provide the extension to the surface as shown in FIG. 4. This extension can be used as follows. The service tanker will approach the surface extension of the SSALM which has a floating hawser and strayline (messenger line). The submarine hose which is hung in a catenary with the probe end at the 70 foot water depth is buoyed and its stray line is attached to the strayline of the floating hawser line. From the ship's bows the strayline will be grappled for and brought onboard, hauled in and the hawser will follow it and be secured through the use of a winch or stopper. The strayline for the oil hose will have been brought on deck and the oil hose will follow it and its probe end will be attached to the quick release coupling. After the loading of the tanker is completed, the procedure is reversed and the lines dropped in the water.

The connection between the storage vessel and the service tanker is, as explained above, resilient and allows for considerable damping of mooring forces between the vessels. This is valuable, especially in an emergency such as parting of the mooring line between the vessels: under such conditions, with system (6), the crew will have time to effect an orderly shutdown and/or disconnection of the oil hose H.

To assist the "dynamic assist" mode of operation and to contribute to the heading control of the storage vessel, air rudders, whose angles relative to the wind can be altered, may be employed. These air rudders are represented by the boxes labelled "AR" in FIG. 3A. One or more air rudders may be constructed on the aft part of the ship to contribute to controlling the yaw motion of the storage vessel and enhance longitudinal stability of said vessel relative to environmental conditions.

The probability that the air rudders can contribute a forward thrust vector as with a sail is anticipated and can contribute to lowering the forces placed on the mooring and the mooring chain. The Coanda Effect principle may also be utilised to enhance the efficiency and effective thrust capability of the air rudders. Where more than one air rudder is employed, their angle of attack may or may not be parallel to each other in order to gain the optimum efficiency of thrust required. The rudders may be manually set or automatically controlled. They may be made of sail cloth or metal, whichever proves best relative to the designed-in Coanda Effect and overall operational efficiency and cost.

The air rudder(s) will preferably be emplaced where, given a certain ship configuration, it (they) will utilise best the laminar flow of air over and around the ship. Turbulent air will be avoided as much as possible.

The Coanda Effect may be utilised in three ways. The first utilisation involves the shrouding of the forward section of each rudder. The shrouds on each side of the rudder may be fixed, rotatable and/or retractable. The operating mechanism for extension or retraction of the shroud may be manual or automatic, mechanically, hydraulically or electrically operated.

The second utilisation of the effect directs high velocity air along the surface of the air rudder by incorporating suitably oriented and positioned air jets, the quantity of which will allow coverage of the entire surface of either or both side of the air rudder. The configuration of the opening surround where each jet is emplaced has a critical shape which allows the most efficient distribution of air into the laminar flow of high velocity air along the rudder. The high velocity jetted air will come from a long tube-like chamber associated with the vertical axis about which the air rudder rotates, i.e. its mast. The air in the tube-like chamber will be under a minimum pressure, to be determined, which can be maintained either naturally or by a forced air fan through an air duct.

The third utilisation of the effect can be realised with the shape of the surface of the air rudder itself.

The control of the orientation (relative direction) of the air rudders can be by mechanical, hydraulic or electric means. Pressure transducers may be used to measure forces which can be mathematically interpreted to optimise the desired force effect.

In preferred embodiments, the mooring configuration between the storage ship and ferry tanker will consist of:

(a) a chafing chain;
(b) a synthetic fibre rope; and
(c) wire.

At the stern of the storage ship there will be placed a wire rope winch. Above it will be a spooling drum for the fibre rope. Astern of the wire rope winch, which may be a rendering winch, will be a concave roller with butt ends over which the mooring line will pass. The roller is held at a specific height above and astern of the wire rope winch by two arms which pivot about an axis. The arms are held in position by springs or hydraulically controlled rams. The concave roller, arms and action mechanisms are called The Damper. The Damper is designed and adjusted to absorb a portion of the shock cyclical loadings placed on the mooring line. This inhibits extraordinary ferry vessel movement and avoids accentuated ferry vessel motion. The fibre rope is not used to bind around a bollard or winch, thus extending the useful life of the rope.

I claim:

1. An oil storage vessel which is provided with (a) a flexible hose for delivery of oil, one end of said hose being adapted for connection to the oil storage capacity of the vessel; and (b) a hose guide system which is constructed so as to receive and support said flexible hose, and which comprises (i) a travelling sheave adapted to allow the flexible hose to pass around it, the sheave being mounted on guide means for travel along a track extending generally along the axis of the vessel; (ii) a first hose support channel positioned on one side of said track, for supporting the flexible hose between its connection with the oil storage capacity of the vessel and the travelling sheave; and (iii) a second hose support channel, positioned on the opposite side of said track to said first hose support channel, for supporting the flexible hose between the travelling sheave and one end of the vessel, and hose guide tongues mounted on said guide means for guiding the hose between the sheave and the first and second hose support channels whereby the flexible hose can be supported in a generally U-shaped course defined by the first hose support channel, the travelling sheave and the second hose support channel between its connection with the oil storage capacity of the vessel and said one end of the vessel.

2. A vessel as claimed in claim 1, wherein said sheave is attached to a constant tension device.

3. A vessel as claimed in claim 2, wherein the constant tension device is a self-tensioning winch.

4. A vessel as claimed in claim 1, wherein said track extends along a major part of the length of the vessel.

5. A vessel as claimed in claim 1, wherein the guide means for said travelling sheave are in the form of a sled which is adapted to travel on said track.

6. A vessel as claimed in claim 5, wherein the sheave is supported on the sled by a ball and race arrangement.

7. A vessel as claimed in claim 1, wherein said track is formed by a pair of parallel rails.

8. A vessel as claimed in claim 1, wherein the flexible hose is connected at one end thereof to a fixed manifold in communication with the oil storage capacity of the vessel, said manifold being adjacent one end of the first hose support channel.

9. A vessel as claimed in claim 1, wherein bearing elements are provided in said second hose support channel against which bearing elements the flexible hose can slide when the travelling sheave moves.

10. A vessel as claimed in claim 1, wherein each of the first and second hose support channels is formed as an elongate trough on the deck of the vessel.

11. A vessel as claimed in claim 1, wherein brake shoes are provided in association with the travelling sheave.

12. A vessel as claimed in claim 1, which also comprises a further support system over which said flexible hose or a hose extension connected to said flexible hose may be carried so as to extend from the stern of the oil storage vessel towards another vessel stationed behind the oil storage vessel.

13. A vessel as claimed in claim 12, which further comprises hose delivery means for conveying said hose from the hose guide system to said further support system.

14. A vessel as claimed in claim 13, wherein the hose delivery means comprise a plurality of horizontal and vertical guide members.

15. A vessel as claimed in claim 12, wherein said further support system comprises an extensible framework in the form of an "A" frame which, in its extended condition, is adapted to hold said flexible hose above the level of the stern of the vessel.

16. A vessel as claimed in claim 15, wherein the "A" frame, in its extended condition, extends upwardly at an oblique angle over and above the stern of the vessel, and, in its collapsed condition, rests in a relatively flat condition on the deck of the ship.

17. A vessel as claimed in claim 16, in which the outward end of said "A" frame is provided with a curved hose guide tray.

18. A vessel as claimed in claim 16, wherein the extensible framework is foldable at least at one lockable joint which enables the extensible framework to be moved from its collapsed condition into its extended condition.

19. A vessel as claimed in claim 1, which is further provided with a bell-mouthed mooring tube whereby the vessel can be held in position on a mooring.

20. A vessel as claimed in claim 19, wherein said mooring tube is located in the forward part of the vessel.

21. A vessel as claimed in claim 19, wherein the mooring tube is part of a spindle arrangement which is also adapted to receive a hose or hoses which, in use, supplies oil to the vessel from a well.

22. A vessel as claimed in claim 21, wherein said spindle is constructed so as to house diving equipment.

23. A vessel as claimed in claim 1, which further comprises a second hose support system which is constructed so as to receive a hose which, in use, conveys oil from a submarine well to the oil storage vessel, wherein the second hose support system comprises a generally vertically disposed, travelling sheave mounted on rails extending along the sea-board side of the vessel.

24. A vessel as claimed in claim 23, wherein said hose is guided to said generally vertically disposed travelling sheave by means of rollers and a frame.

25. A vessel as claimed in claim 24, which further comprises hose support rollers extending between said generally vertically disposed, travelling sheave and a manifold through which oil can be fed into the oil storage capacity of the vessel.

26. A vessel as claimed in claim 1, which is further provided with air rudders.

27. A vessel as claimed in claim 1, which is further provided with means for damping cyclical shock forces which tend to occur on a mooring between the vessel and a service tanker.

28. Apparatus for providing a deep water submerged mooring for a vessel at sea, which comprises a base located on the sea bed; a buoyant riser attached to said base by a universal joint; a fluid swivel connected to the top of the riser by a coupling; a hose guide tray attached to said fluid swivel; and a spacer buoy attached to said fluid swivel by a universal joint, such that the hose guide tray acts as a lever to facilitate rotation of the fluid swivel in response to movement of a hose passing over the hose guide tray and extending to said vessel, and wherein a chain beam and mooring chain are attached to said spacer buoy whereby said vessel can be moored to the apparatus.

29. Apparatus as claimed in claim 28, wherein said mooring chain is mounted on the spacer buoy in a manner permitting movement in two orthogonal planes.

30. Apparatus as claimed in claim 28, which further includes an oil pipeline between the base and the fluid swivel.

31. Apparatus as claimed in claim 28, wherein an upper portion of said spacer buoy is provided with an extension such that, in use, it penetrates the sea surface and can act as a mooring buoy for tethering a ferry tanker.

32. A method of delivering oil from an off-shore well to the shore, which comprises the steps of (a) supplying oil from the well, or from a production facility associated with the well, to a floating storage vessel moored close to the well; (b) ferrying a service tanker from the shore towards the oil storage vessel; (c) tethering said service tanker to the oil storage vessel; (d) transferring oil from the oil storage vessel to said service tanker by means of a flexible hose connected at one end thereof to the oil storage capacity of said oil storage vessel and the other end of which extends directly or via hose extensions to the service tanker; (e) stabilising the transfer of oil by causing said flexible hose to travel in a generally U-shaped course before it leaves the oil storage vessel, said course being defined by a first hose support channel, a travelling sheave around which the flexible hose passes, and a second hose support channel, said travelling sheave being mounted on guide means for travel along a track extending generally along the axis of the vessel, said guide means including hose guide tongues for guiding said hose between said sheave and said first and second hose support channels, and being attached to a constant tension device whereby relative movement between the oil storage vessel and the service tanker can be accommodated through travel of the sheave along its track, thereby paying out a greater or lesser length of flexible hose in accordance with the separation at any given time between the oil storage vessel and the service tanker; (f) disconnecting the supply of oil when a predetermined quantity has been transferred to the service tanker; and (g) ferrying said service tanker back to the shore.

33. A method according to claim 32, wherein during transfer of oil from the floating storage vessel to the service tanker, the positioning of at least one of said vessel and said tanker relative to the other is assisted by controlling air rudders provided on the vessel or the tanker.

* * * * *